United States Patent
Lee et al.

(10) Patent No.: US 8,879,872 B2
(45) Date of Patent: Nov. 4, 2014

(54) METHOD AND APPARATUS FOR RESTORING RESOLUTION OF MULTI-VIEW IMAGE

(75) Inventors: Seok Lee, Hwaseong-si (KR); Byung Tae Oh, Seoul (KR); Jae Joon Lee, Seoul (KR); Ho Cheon Wey, Seongnam-si (KR); Seung Sin Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 38 days.

(21) Appl. No.: 13/489,973

(22) Filed: Jun. 6, 2012

(65) Prior Publication Data

US 2012/0328212 A1 Dec. 27, 2012

(30) Foreign Application Priority Data

Jun. 27, 2011 (KR) .................. 10-2011-0062364

(51) Int. Cl.
*G06K 9/32* (2006.01)
*G06T 3/40* (2006.01)

(52) U.S. Cl.
CPC ..... *G06T 3/4053* (2013.01); *G06T 2207/20024* (2013.01); *G06T 2207/10016* (2013.01); *G06T 2207/20224* (2013.01)
USPC .......................................... 382/299; 382/298

(58) Field of Classification Search
USPC ......... 382/298, 299; 348/36, 441; 359/11, 22; 369/103; 345/472, 600
See application file for complete search history.

(56) References Cited

U.S. PATENT DOCUMENTS

| | | | |
|---|---|---|---|
| 6,532,036 B1 * | 3/2003 | Peleg et al. ............... | 348/36 |
| 7,006,124 B2 * | 2/2006 | Peleg et al. ............... | 348/36 |
| 8,159,606 B2 * | 4/2012 | Sole et al. ................ | 348/441 |
| 2007/0041664 A1 | 2/2007 | Yamada ................... | 382/276 |
| 2010/0119176 A1 | 5/2010 | Ichihashi et al. .......... | 382/300 |
| 2010/0271511 A1 | 10/2010 | Ma et al. .................. | 382/254 |
| 2011/0050991 A1 | 3/2011 | Bellers et al. ............. | 348/441 |

FOREIGN PATENT DOCUMENTS

| | | |
|---|---|---|
| JP | 2009-100424 | 5/2009 |
| JP | 2011-15262 | 1/2011 |
| JP | 2011-22868 | 2/2011 |
| KR | 10-2008-0085156 | 9/2008 |
| KR | 10-2010-0071803 | 6/2010 |
| KR | 10-2010-0121885 | 11/2010 |
| KR | 10-2011-0017336 | 2/2011 |

OTHER PUBLICATIONS

Uma Mudenagudi et al., "Super Resolution of Images of 3D Scenecs" Nov. 2007, pp. 85-95.
European Search Report issued in corresponding European Patent Application 12173880.1 dated Nov. 5, 2012.

* cited by examiner

*Primary Examiner* — Anh Do
(74) *Attorney, Agent, or Firm* — Staas & Halsey LLP

(57) ABSTRACT

A method and apparatus for restoring a resolution of a low resolution view image from a multi-view image. In the resolution restoration method, detailed information may be generated using a reference image neighboring a criterion image, and a resolution of the criterion image may be restored using the detailed information.

27 Claims, 8 Drawing Sheets

METHOD AND APPARATUS FOR RESTORING RESOLUTION OF MULTI-VIEW IMAGE

CROSS-REFERENCE TO RELATED APPLICATIONS

This application claims the priority benefit of Korean Patent Application No. 10-2011-0062364, filed on Jun. 27, 2011, in the Korean Intellectual Property Office, the disclosure of which is incorporated herein by reference.

BACKGROUND

1. Field

One or more embodiments of the present disclosure relate to a method and apparatus for restoring a high frequency element of a low resolution image from a three-dimensional (3D) multi-view image. More specifically, example embodiments relate to a method and apparatus to up-scale a criterion image based on a resolution of a reference image neighboring the criterion image, generating detailed information based on the reference image, and restoring a resolution of the criterion image using the up-scaled criterion image and the detailed information.

2. Description of the Related Art

Generally, a single camera is used to capture a two-dimensional (3D) image. However, an image system provides a three-dimensional (3D) image by photographing image data from a plurality of viewpoints. In this instance, the photographed image data is converted and stored in a predetermined type of format. The converted and stored image data is compressed, and transmitted to a display device. The image data may be played back as a 3D image, a stereo 3D image, or a multi-view 3D image, depending on a type of the display device.

A low resolution image and a high resolution image may be combined in a multi-view image. Accordingly, when the multi-view image is decoded, quality degradation may be observed in the decoded low resolution image, rather than the high resolution image.

Accordingly, there is a desire for a technology that may reduce quality degradation of a low resolution image in a multi-view image.

SUMMARY

The foregoing and/or other aspects are achieved by providing a method of restoring a resolution of a multi-view image, the method including up-scaling a criterion image based on a resolution of a reference image neighboring the criterion image, generating detailed information based on the reference image, and restoring a resolution of the criterion image using the up-scaled criterion image and the detailed information.

The restoring may include restoring the resolution of the criterion image by filtering the up-scaled criterion image based on a filter coefficient.

The restoring may include restoring the resolution of the criterion image using difference image information and the up-scaled criterion image.

The generating may include down-scaling of the reference image, based on the resolution of the criterion image, up-scaling the down-scaled reference image, based on the resolution of the reference image, and generating the detailed information, using the up-scaled reference image and the reference image.

The restoring may include dividing the up-scaled criterion image into a plurality of blocks, determining, from the reference image, a block corresponding to a criterion block that is one of the plurality of divided blocks, calculating a disparity based on the criterion block and the corresponding block of the reference image, and compensating for a viewpoint difference between the criterion image and the reference image, based on the calculated disparity.

The generating may include calculating a resolution ratio based on the resolution of the criterion image and the resolution of the reference image, down-scaling the corresponding block based on the resolution ratio, up-scaling the down-scaled corresponding block based on the resolution ratio, and generating detailed information of the corresponding block based on the up-scaled corresponding block, and the corresponding block. The restoring may include restoring a resolution of a current block corresponding to the criterion block, from the criterion image, using the detailed information of the corresponding block and the criterion block.

The method may further include generating a virtual view image by synthesizing the reference image and the criterion image with the restored resolution.

The foregoing and/or other aspects are achieved by providing an apparatus for restoring a resolution, the apparatus including an up-scaling unit to up-scale a criterion image, based on a resolution of a reference image neighboring the criterion image, a detailed information generator to generate detailed information based on the reference image, and a restoration unit to restore a resolution of the criterion image using the up-scaled criterion image and the detailed information.

The detailed information generator may down-scale the reference image, based on the resolution of the criterion image, up-scale the down-scaled reference image, based on the resolution of the reference image, and generate the detailed information, using the up-scaled reference image, and the reference image.

The restoration unit may include a corresponding block determining unit to divide the up-scaled criterion image into a plurality of blocks, and to determine, from the reference image, a block corresponding to a criterion block that is one of the plurality of divided blocks, a disparity calculating unit to calculate a disparity based on the criterion block and the corresponding block of the reference image, and a compensation unit to compensate for a viewpoint difference between the criterion image and the reference image, based on the calculated disparity.

The detailed information generator may calculate a resolution ratio, based on the resolution of the criterion image and the resolution of the reference image, down-scale the corresponding block, based on the resolution ratio, up-scale the down-scaled corresponding block, based on the resolution ratio, and generate detailed information of the corresponding block, based on the up-scaled corresponding block, and the corresponding block. The restoration unit may restore a resolution of a current block corresponding to the criterion block, from the criterion image, using the detailed information of the corresponding block, and the criterion block.

The apparatus may further include a virtual view image generator to generate a virtual view image by synthesizing the reference image, and the criterion image with the restored resolution.

The up-scaling unit, the restoration unit, and the virtual view image generator may be included on one chip.

The foregoing and/or other aspects are achieved by providing a method for restoring a resolution of a multi-view image, the method including up-scaling a low-quality image, among images constituting the multi-view image; and restoring a high-frequency element to the low-quality image, using detailed information and the up-scaled low-quality image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will be apparent and more readily appreciated from the following description of embodiments, taken in conjunction with the accompanying drawings of which.

DETAILED DESCRIPTION

Figure 1:
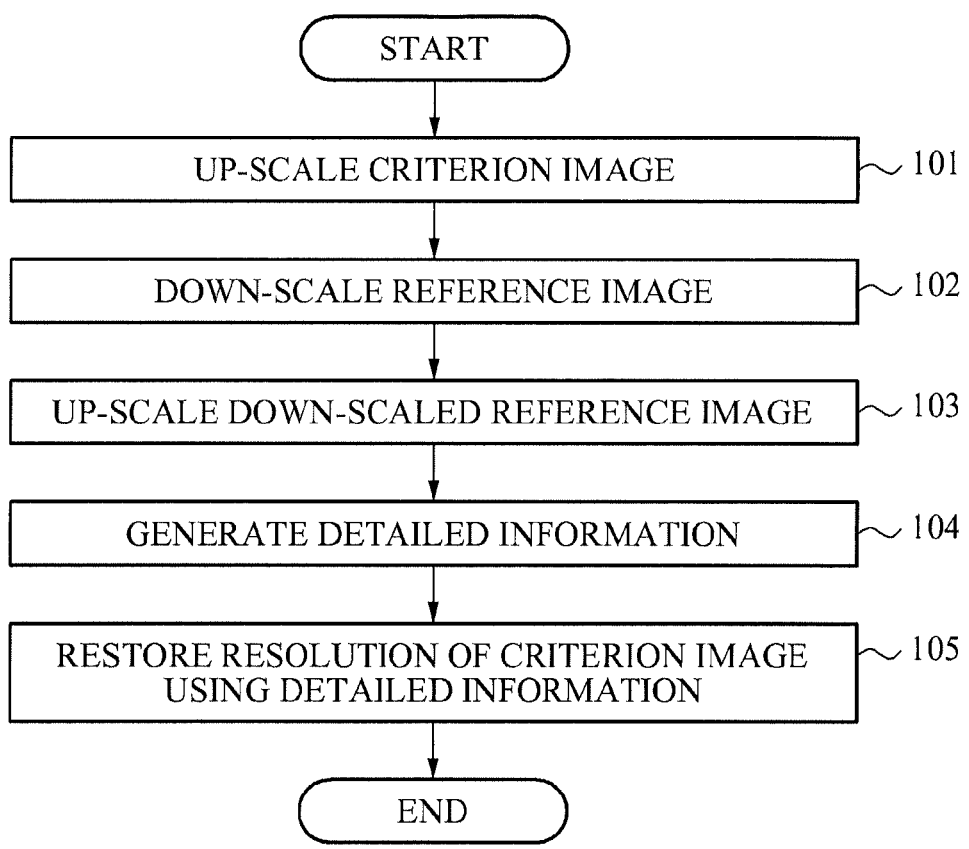
FIG. 1 illustrates a method of restoring a resolution of a criterion image in a resolution restoration apparatus, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of restoring a resolution of a criterion image in a resolution restoration apparatus, according to example embodiments.

Referring to FIG. 1, in operation 101, the resolution restoration apparatus may up-scale the criterion image based on a resolution of a reference image neighboring the criterion image.

As an example, the resolution restoration apparatus may increase a size of the criterion image to be identical to a size of the reference image. For example, when a resolution of the reference image is higher than a resolution of the criterion image by a factor of 'a', the resolution restoration apparatus may increase the size of the criterion image by a factor of 'a' based on the resolution of the reference image.

Here, the criterion image may correspond to a low resolution view image, among view images constituting a multi-view image. The reference image may correspond to a high resolution view image, among the view images constituting the multi-view image. In this instance, the reference image may correspond to a view image neighboring the criterion image, among the view images constituting the multi-view image, and may correspond to an image having a viewpoint different from a view point of the criterion image. For example, when the criterion image corresponds to a view 1 of FIG. 2, the reference image may correspond to a view 2 of FIG. 2.

In operation 102, the resolution restoration apparatus may down-scale the reference image, based on the resolution of the criterion image.

As an example, the resolution restoration apparatus may decrease a size of the reference image to be identical to a size of the criterion image. For example, when a resolution of the criterion image is lower than a resolution of the reference image by a factor of '1/a', the resolution restoration apparatus may decrease the size of the reference image by a factor of '1/a' based on the resolution of the criterion image.

In operation 103, the resolution restoration apparatus may up-scale the down-scaled reference image. In this instance, the resolution restoration apparatus may up-scale the down-scaled reference image, based on the resolution of the original reference image.

For example, when the size of the reference image is down-scaled by a factor of '1/a', the resolution restoration apparatus may up-scale the down-scaled reference image by increasing the size of the down-scaled reference image by a factor of 'a'.

In operation 104, the resolution restoration apparatus may generate detailed information using the up-scaled reference image and the original reference image. In this case, the detailed information may include at least one of filter coefficient information and difference image information.

As an example, the resolution restoration apparatus may calculate a filter coefficient in order to restore a difference between the up-scaled reference image and the original reference image. For example, when a Wiener filter is used as a restoration filter, the resolution restoration apparatus may calculate a Wiener filter coefficient based on the difference between the up-scaled reference image and the original reference image.

As another example, the resolution restoration apparatus may generate the difference image information by removing the up-scaled reference image from the original reference image.

In operation 105, the resolution restoration apparatus may restore the resolution of the criterion image using the detailed information and the up-scaled criterion image.

As an example, when the filter coefficient information is included in the detailed information, the resolution restoration apparatus may restore a high frequency element of the criterion image by filtering the up-scaled criterion image based on the filter coefficient information.

As another example, when the difference image information is included in the detailed information, the resolution restoration apparatus may restore a high frequency element of the criterion image by adding the difference image information and the up-scaled criterion image.

As discussed above, the resolution restoration apparatus may restore the resolution of the criterion image, using the view image neighboring the criterion image as the reference image, thereby reducing an amount of data of the multi-view image transmitted by an image coding apparatus. In other words, even when the image coding apparatus transmits an image including both a low resolution image and a high resolution image, the resolution restoration apparatus may reduce quality degradation by restoring a high frequency element of the low resolution image, and may reduce the amount of data of the multi-view image transmitted by the image coding apparatus.

Figure 2:
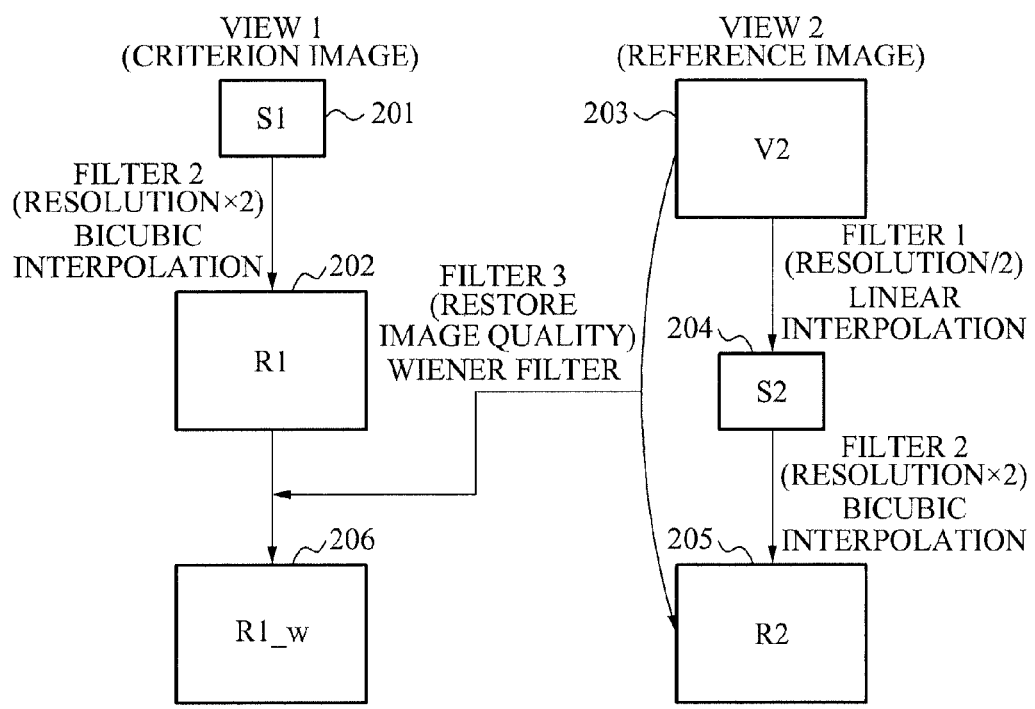
FIG. 2 illustrates a process of restoring a resolution of a criterion image in a resolution restoration apparatus, according to example embodiments.

FIG. 2 illustrates a process of restoring a resolution of a criterion image 201 in a resolution restoration apparatus, according to example embodiments.

Referring to FIG. 2, the resolution restoration apparatus may up-scale a size of a criterion image 201 with a low resolution based on a resolution of a reference image 203.

The resolution restoration apparatus may down-scale a size of the reference image 203 with a high resolution, based on a resolution of the criterion image 201. In this case, the reference image may correspond to an adjacent view image neighboring the criterion image 201, among view images constituting a multi-view image.

The resolution restoration apparatus may up-scale a size of a down-scaled reference image 204 to be identical to the size of the original reference image 203.

The resolution restoration apparatus may generate detailed information using an up-scaled reference image 205 and the original reference image 203. The detailed information may include at least one of filter coefficient information and difference image information.

The resolution restoration apparatus may restore the resolution of the criterion image 201 using the detailed information and an up-scaled criterion image 202. That is, the resolution restoration apparatus may generate an image 206, in which a high frequency element of the criterion image 201 may be restored.

As an example, when the filter coefficient information is included in the detailed information, the resolution restoration apparatus may restore the resolution of the criterion image 201 by filtering the up-scaled criterion image 202, based on the filter coefficient information.

As another example, when the difference image information is included in the detailed information, the resolution restoration apparatus may restore the resolution of the criterion image 201 by adding the difference image information and the up-scaled criterion image 202.

Figure 3:
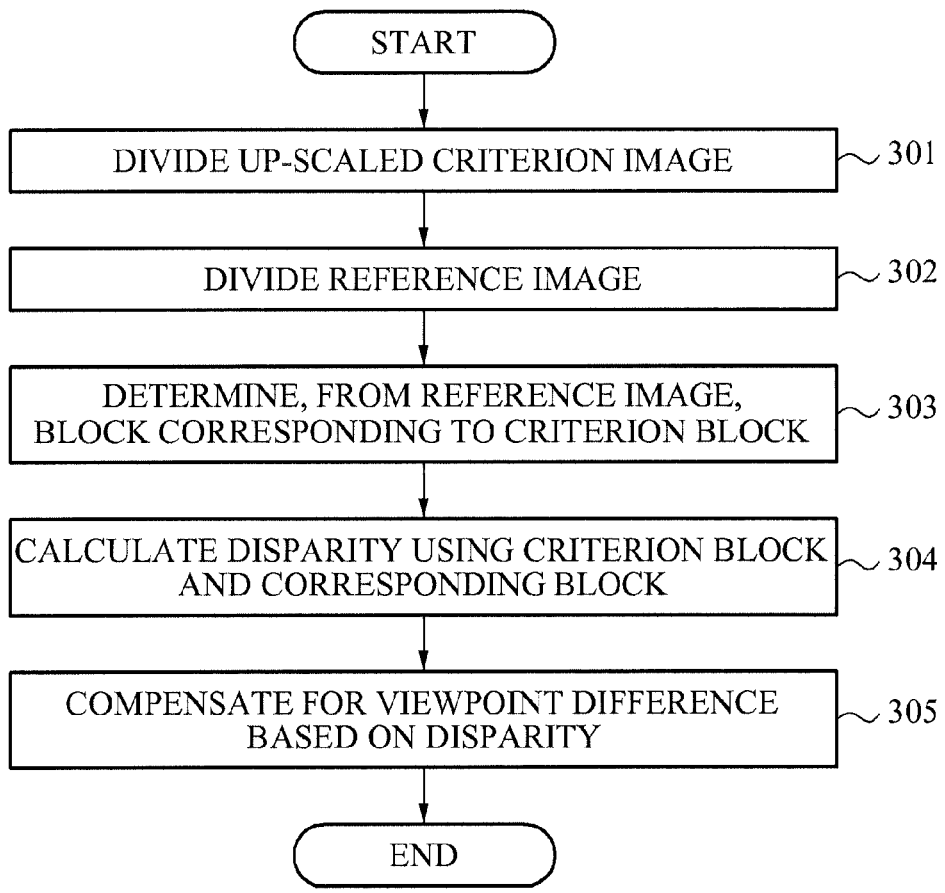
FIG. 3 illustrates a method of restoring a resolution of a criterion image by compensating for a viewpoint difference, according to example embodiments.

FIG. 3 illustrates a method of restoring a resolution of a criterion image by compensating for a viewpoint difference according to example embodiments.

Referring, once more, to FIGS. 1 and 2, a resolution restoration apparatus may restore a resolution of a criterion image using an adjacent view image as a reference image. Here, the adjacent view image may be captured from a viewpoint different from a viewpoint of the criterion image. When the resolution of the criterion image is restored using an image captured from a different viewpoint, a viewpoint difference may occur between the criterion image and a restored image. Accordingly, a method of compensating for the viewpoint difference will be described with reference to FIG. 3.

In operation 301, the resolution restoration apparatus may divide an up-scaled criterion image into a plurality of blocks.

In operation 302, the resolution restoration apparatus may divide a reference image into a plurality of blocks. In this instance, the resolution restoration apparatus may divide the reference image into a plurality of blocks corresponding to a number of the plurality of divided blocks of the criterion image. For example, when the up-scaled criterion image is divided into 32×32 blocks, the resolution restoration apparatus may divide the reference image into 32×32 blocks.

In operation 303, the resolution restoration apparatus may determine, from the reference image, a block corresponding to a criterion block. Here, the criterion block may correspond to one of the plurality of blocks constituting the up-scaled criterion image.

As an example, the resolution restoration apparatus may determine a block that may be present in a location corresponding to a location of the criterion block, to be a corresponding block. For example, when a block 1 in the criterion image divided into 32×32 blocks corresponds to the criterion block, the resolution restoration apparatus may determine, from the reference image, a block 1 in the reference image to be the corresponding block.

In operation 304, the resolution restoration apparatus may calculate a disparity using the criterion block and the corresponding block.

For example, the resolution restoration apparatus may calculate the disparity using a pixel location difference between the criterion block and the corresponding block.

In operation 305, the resolution restoration apparatus may compensate for a viewpoint difference between the criterion image and the reference image using the calculated disparity. For example, the resolution restoration apparatus may compensate for the viewpoint difference by moving the reference image based on the calculated disparity. In this instance, the resolution restoration apparatus may compensate for the viewpoint difference using a global disparity process or a local disparity process.

Figure 4:
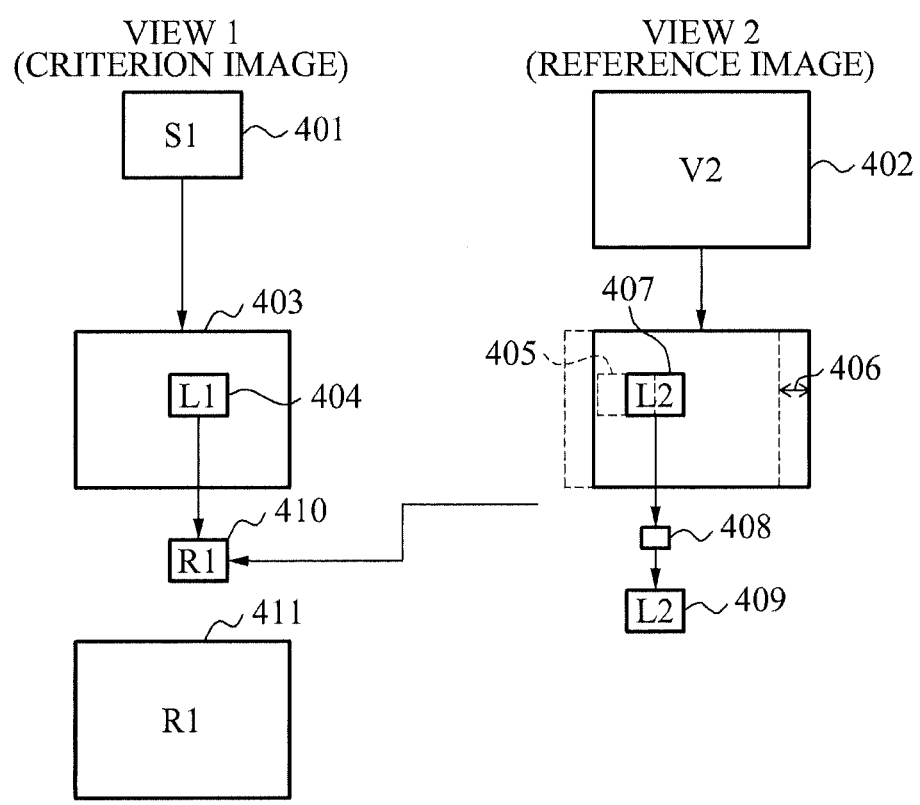
FIG. 4 illustrates a process of compensating for a viewpoint difference between a criterion image and a reference image, according to example embodiments.

FIG. 4 illustrates a process of compensating for a viewpoint difference between a criterion image and a reference image, according to example embodiments.

Referring to FIG. 4, a resolution restoration apparatus may up-scale a criterion image 401, based on a resolution of a reference image 402.

The resolution restoration apparatus may determine, from the reference image 402, a corresponding block 405 present in a location corresponding to a location of a criterion block 404 of an up-scaled criterion image 403. For example, the resolution restoration apparatus may determine the corresponding block 405, present in the location corresponding to the location of the criterion block 404, using an algorithm for motion estimation or depth information of the up-scaled criterion image 403.

The resolution restoration apparatus may calculate a disparity 406, based on a pixel difference between the criterion block 404 and the corresponding block 405.

The resolution restoration apparatus may compensate for a viewpoint difference between the criterion block 404 and the corresponding block 405, by moving the corresponding block 405 based on the calculated disparity 406. In this instance, the resolution restoration apparatus may compensate for viewpoint differences for all of the blocks constituting the reference image 402. Accordingly, the resolution restoration apparatus may compensate for the viewpoint difference between the criterion image 401 and the reference image 402. For example, the resolution restoration apparatus may compensate for the viewpoint difference using a global disparity process or a local disparity process. A method of compensating for the viewpoint using the global disparity process or the local disparity process will be described later with reference to FIGS. 5 and 6.

The resolution restoration apparatus may down-scale a corresponding block 407 of which viewpoint difference is compensated for, based on a resolution ratio. In this case, the resolution ratio may be calculated based on a resolution difference between the criterion image 401 and the reference image 402.

The resolution restoration apparatus may up-scale a size of a down-scaled corresponding block 408, based on the resolution ratio, to be identical to a size of the original corresponding block 405.

The resolution restoration apparatus may generate detailed information of the corresponding block 405 based on a difference between an up-scaled corresponding block 409 and the original corresponding block 405. Here, the detailed information of the corresponding block 405 may include filter coefficient information and difference block information of the corresponding block 405.

The resolution restoration apparatus may restore, from the criterion image 401, a resolution of a current block corresponding to the criterion block 404, using the detailed information of the corresponding block 405, and the criterion block 404. That is, the resolution restoration apparatus may generate a restored block 410 by restoring a high frequency element of the current block. In this instance, the current block may correspond to a block present in a location corresponding to a location of the criterion block 404 of the up-scaled criterion image 403. That is, the current block may refer to a block existing before the criterion block 404 is up-scaled.

Similarly, the resolution restoration apparatus may restore resolutions of all of the blocks constituting the criterion image 401, based on detailed information of corresponding blocks, each present in a location corresponding to a location of each of all the blocks, constituting the up-scaled criterion image 403. The resolution restoration apparatus may generate a restored image 411 by restoring the resolution of the criterion image 401.

The resolution restoration apparatus may generate a virtual view image by synthesizing the restored image 411 and the reference image 402.

Figure 5:
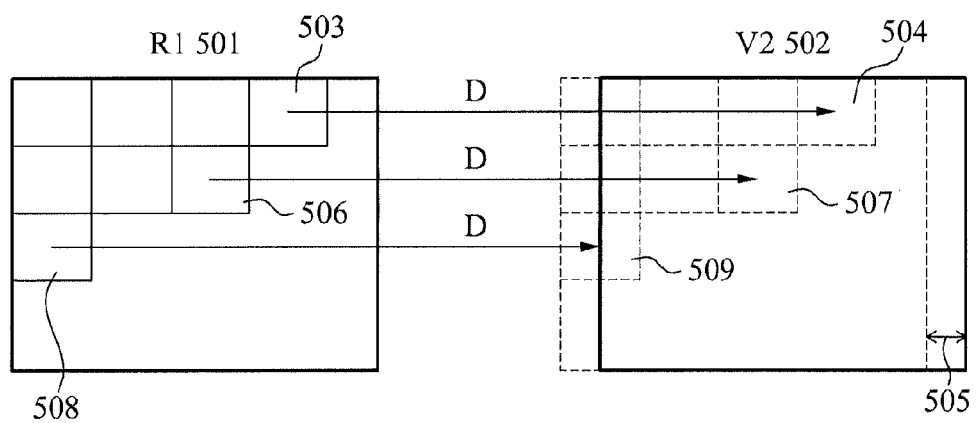
FIG. 5 illustrates a method of compensating for a viewpoint difference using a global disparity process, according to example embodiments.

FIG. 5 illustrates a method of compensating for a viewpoint difference using a global disparity process, according to example embodiments.

Referring to FIG. 5, a resolution restoration apparatus may determine one of a plurality of blocks constituting an up-scaled criterion image 501, to be a criterion block. The resolution restoration apparatus may determine, from a reference image 502, a corresponding block present in a location corresponding to a location of the criterion block. In this instance, the resolution restoration apparatus may determine the corresponding block using an algorithm for motion estimation, or depth information of the up-scaled criterion image 501.

The resolution restoration apparatus may calculate a global disparity by calculating a pixel difference between the criterion block and the reference image 502. The resolution restoration apparatus may compensate for a viewpoint difference between the criterion image 501 and the reference image 502 by equally applying the calculated global disparity to all of the blocks constituting the up-scaled criterion image 501.

For example, when a global disparity 505 between a first criterion block 503 and a first corresponding block 504 is calculated, the resolution restoration apparatus may move the first corresponding block 504, based on the calculated global disparity 505, and may also move a second block 507 corresponding to a second criterion block 506, and a third block 509 corresponding to a third criterion block 508, based on the equal global disparity 505. The resolution restoration apparatus may move the reference image 502 by applying the equal global disparity 505 to all of the blocks constituting the criterion image 501, and may compensate for the viewpoint difference between the criterion image 501 and the reference image 502. That is, the resolution restoration apparatus may compensate for the view difference, based on the global disparity 505 so that a viewpoint of the reference image 502 may be identical to a viewpoint of the criterion image 501.

As mentioned in the foregoing with reference to FIGS. 3 and 4, the resolution restoration apparatus may down-scale a corresponding block of a reference image, based on a resolution ratio, and may up-scale the down-scaled corresponding block. The resolution restoration apparatus may generate detailed information of the corresponding block using a difference between the up-scaled corresponding block and the original corresponding block. The resolution restoration apparatus may restore a resolution of a current block using the generated detailed information of the corresponding block, and the criterion block. Here, the current block may correspond to a block present in a location corresponding to a location of the criterion block 503 of the up-scaled criterion image 501, in the original criterion image existing before the original criterion image is up-scaled.

Figure 6:
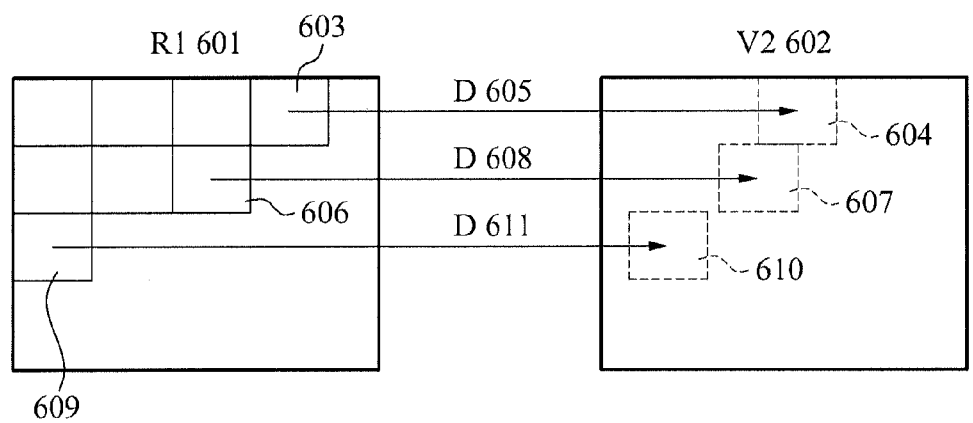
FIG. 6 illustrates a method of compensating for a viewpoint difference using a local disparity process, according to example embodiments.

FIG. 6 illustrates a method of compensating for a viewpoint difference using a local disparity process, according to example embodiments.

Referring to FIG. 6, a resolution restoration apparatus may respectively determine, from a reference image 602, corresponding blocks present in locations corresponding to locations of a plurality of blocks constituting an up-scaled criterion image 601. In this instance, the resolution restoration apparatus may determine a corresponding block using an algorithm for motion estimation, or depth information of the up-scaled criterion image 601.

The resolution restoration apparatus may calculate disparities for each block by calculating a pixel difference between each criterion block of the criterion image 601 and each corresponding block of the reference image 602. The resolution restoration apparatus may compensate for a viewpoint difference between the criterion image 601 and the reference image 602 by moving each of the corresponding blocks, based on the calculated disparities for each block. In this instance, the resolution restoration apparatus may calculate a local disparity for each block using depth information of each criterion block. Here, the local disparity may correspond to an average disparity.

For example, when a first disparity 605 between a first criterion block 603 and a first corresponding block 604 is calculated, the resolution restoration apparatus may move the first corresponding block 604 based on the calculated first disparity 605. When a second disparity 608 between a second criterion block 606 and a second corresponding block 607 is calculated, the resolution restoration apparatus may move the second corresponding block 607 based on the calculated second disparity 608. When a third disparity 611 between a third criterion block 609 and a third corresponding block 610 is calculated, the resolution restoration apparatus may move the third corresponding block 610 based on the calculated third disparity 611. Similarly, the resolution restoration apparatus may respectively move a plurality of corresponding blocks constituting the reference image 602 based on the disparities for each block. Accordingly, the resolution restoration apparatus may compensate for the viewpoint difference so that a viewpoint of the reference image 602 may be identical to a viewpoint of the criterion image 601.

Figure 7:
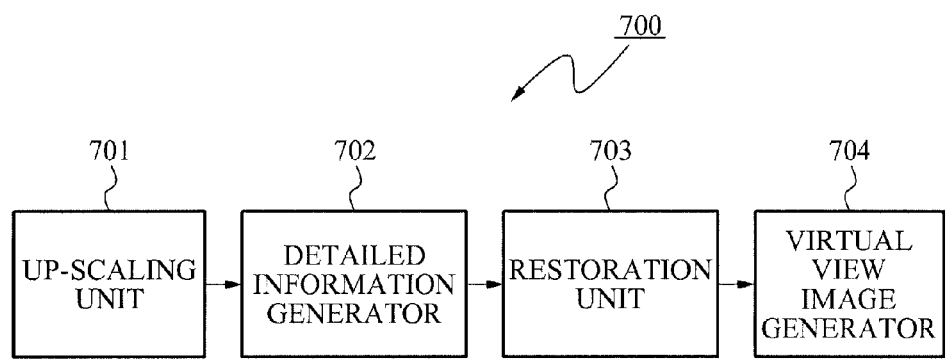
FIG. 7 illustrates a configuration of a resolution restoration apparatus, according to example embodiments.

FIG. 7 illustrates a configuration of a resolution restoration apparatus 700, according to example embodiments.

Referring to FIG. 7, the resolution restoration apparatus 700 may include an up-scaling unit 701, a detailed information generator 702, a restoration unit 703, and a virtual view image generator 704.

The up-scaling unit 701 may up-scale a criterion image based on a resolution of a reference image neighboring the criterion image. For example, the up-scaling unit 701 may increase a size of the criterion image to be identical to a size of the reference image.

In this instance, the criterion image may correspond to a low resolution image, constituting a multi-view image. That is, the reference image may correspond to a high resolution image neighboring the criterion image, among view images constituting the multi-view image, and may have a viewpoint different from a viewpoint of the criterion image. For example, when the criterion image corresponds to a view image 1, the reference image may correspond to a view image 2.

The detailed information generator 702 may generate detailed information using the reference image, in order to restore a resolution of the criterion image. Here, the detailed information may include at least one of filter coefficient information and difference image information.

As an example, the detailed information generator 702 may down-scale the reference image, based on the resolution of the criterion image. The detailed information generator 702 may up-scale the down-scaled reference image based on the resolution of the original reference image. The detailed information generator 702 may generate detailed information using the up-scaled reference image and the original reference image. For example, the detailed information generator 702 may generate, as the detailed information, filter coefficient information or difference image information in order to compensate for a difference between the original reference image and the up-scaled reference image.

The restoration unit 703 may restore the resolution of the up-scaled criterion image, using the detailed information.

As an example, when the filter coefficient information is used, the restoration unit 703 may restore a high frequency element of the criterion image by filtering the up-scaled criterion image, using a Wiener filter based on the filter coefficient information.

As another example, when the difference image information is used, the restoration unit 703 may restore the resolution of the criterion image by removing the difference image information from the up-scaled criterion image.

The detailed information generator 702 may also generate detailed information for each block constituting the reference image.

As an example, the detailed information generator 702 may calculate a resolution ratio, based on a resolution of the criterion image, and a resolution of the reference image. The detailed information generator 702 may down-scale a corresponding block of the reference image, based on the calculated resolution ratio. Here, the corresponding block may be present in a location corresponding to a location of a criterion block, among blocks constituting the criterion image. The detailed information generator 702 may up-scale the down-scaled corresponding block based on the resolution ratio. The detailed information generator 702 may generate detailed information of the corresponding block using the up-scaled corresponding block and the original corresponding block.

The restoration unit 703 may restore the resolution of the criterion block using the detailed information of the corresponding block.

In this instance, since the resolution of the criterion image is restored using an image, having a viewpoint difference from a viewpoint of the criterion image, as the reference image, a viewpoint difference between the original criterion image and the restored criterion image may occur. Accordingly, the resolution of the criterion image should be restored, by compensating for the viewpoint difference so that the viewpoint of the reference image may be identical to the viewpoint of the criterion image. A configuration to compensate for the viewpoint difference will be described later with reference to FIG. 8.

The virtual view image generator 704 may generate a virtual view image by synthesizing the reference image, and the criterion image with the restored resolution. Since the virtual view image generator 704 may generate the virtual view image, an M×M multi-view image may be played back when only a partial view image of the M×M multi-view image is received.

Although it has been described in FIG. 7 that each of the up-scaling unit 701, the restoration unit 703, and the virtual view image generator 704 may be configured as a separate chipset, the up-scaling unit 701 and the restoration unit 703 may be integrated with the virtual view image generator 704. That is, configurations to up-scale a criterion image, to restore a resolution of the up-scaled criterion image based on detailed information, and to generate a virtual view image by synthesizing the restored image and a reference image may be included on one chip.

Figure 8:
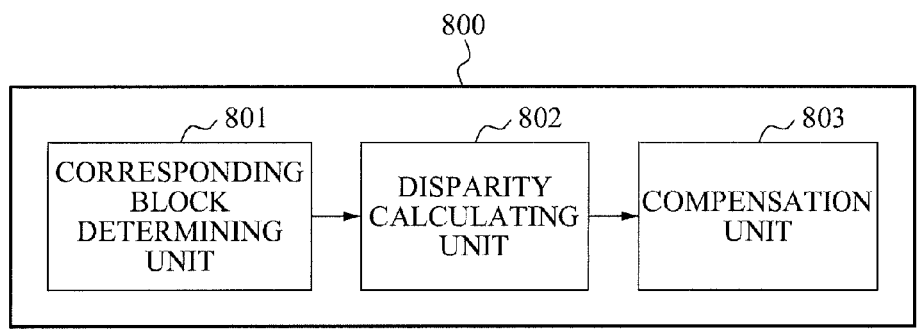
FIG. 8 illustrates a configuration of a restoration unit that may compensate for a viewpoint difference, according to example embodiments.

FIG. 8 illustrates a configuration of a restoration unit 800 that may compensate for a viewpoint difference, according to example embodiments.

Referring to FIG. 8, the restoration unit 800 may include a corresponding block determining unit 801, a disparity calculating unit 802, and a compensation unit 803.

The corresponding block determining unit 801 may divide an up-scaled criterion image into a plurality of blocks, and may divide a reference image into a plurality of blocks. In this instance, the corresponding block determining unit 801 may divide the reference image based on a number of the blocks constituting the up-scaled criterion image. For example, when the up-scaled criterion image is divided into 32×32 blocks, the corresponding block determining unit 801 may divide the reference image into 32×32 blocks.

The corresponding block determining unit 801 may determine, from the reference image, a corresponding block present in a location corresponding to a location of a criterion block of the criterion image. Here, the criterion block may correspond to one of the plurality of blocks constituting the up-scaled criterion image. In this instance, the corresponding block determining unit 801 may determine the corresponding block using an algorithm for motion estimation or depth information of the criterion block.

The disparity calculating unit 802 may calculate a disparity based on the criterion block and the corresponding block.

As an example, when a global disparity process is used, the disparity calculating unit 802 may calculate a global disparity based on the corresponding block and the criterion block corresponding to one of the plurality of blocks constituting the criterion image.

The compensation unit 803 may compensate for a viewpoint difference between the criterion image and the reference image by equally applying the calculated global disparity to all of the blocks constituting the criterion image. For example, when a first corresponding block is present two pixels to the left of a first criterion block, the compensation unit 803 may move the first corresponding block two pixels to the right. Similarly, the compensation unit 803 may compensate for the viewpoint difference by respectively moving N corresponding blocks, constituting the reference image, two pixels to the right.

As another example, when a local disparity process is used, the disparity calculating unit 802 may calculate a local disparity based on blocks constituting the criterion image, and corresponding blocks of the reference image corresponding to the blocks constituting the criterion image. That is, the disparity calculating unit 802 may calculate the local disparity for each block including a criterion block and a corresponding block in pairs. Here, the local disparity may correspond to an average disparity of the blocks.

The compensation unit 803 may compensate for viewpoint differences for each block, based on the calculated local disparity. For example, when a first corresponding block is present two pixels to the left of a first criterion block, the compensation unit 803 may move the first corresponding block two pixels to the right. When a second corresponding block is present a pixel left on the basis of a second criterion block, the compensation unit 803 may move the second corresponding block a pixel to the right. Similarly, the compensation unit 803 may respectively move N corresponding blocks, constituting the reference image, based on the local disparity for each block.

Figure 9:
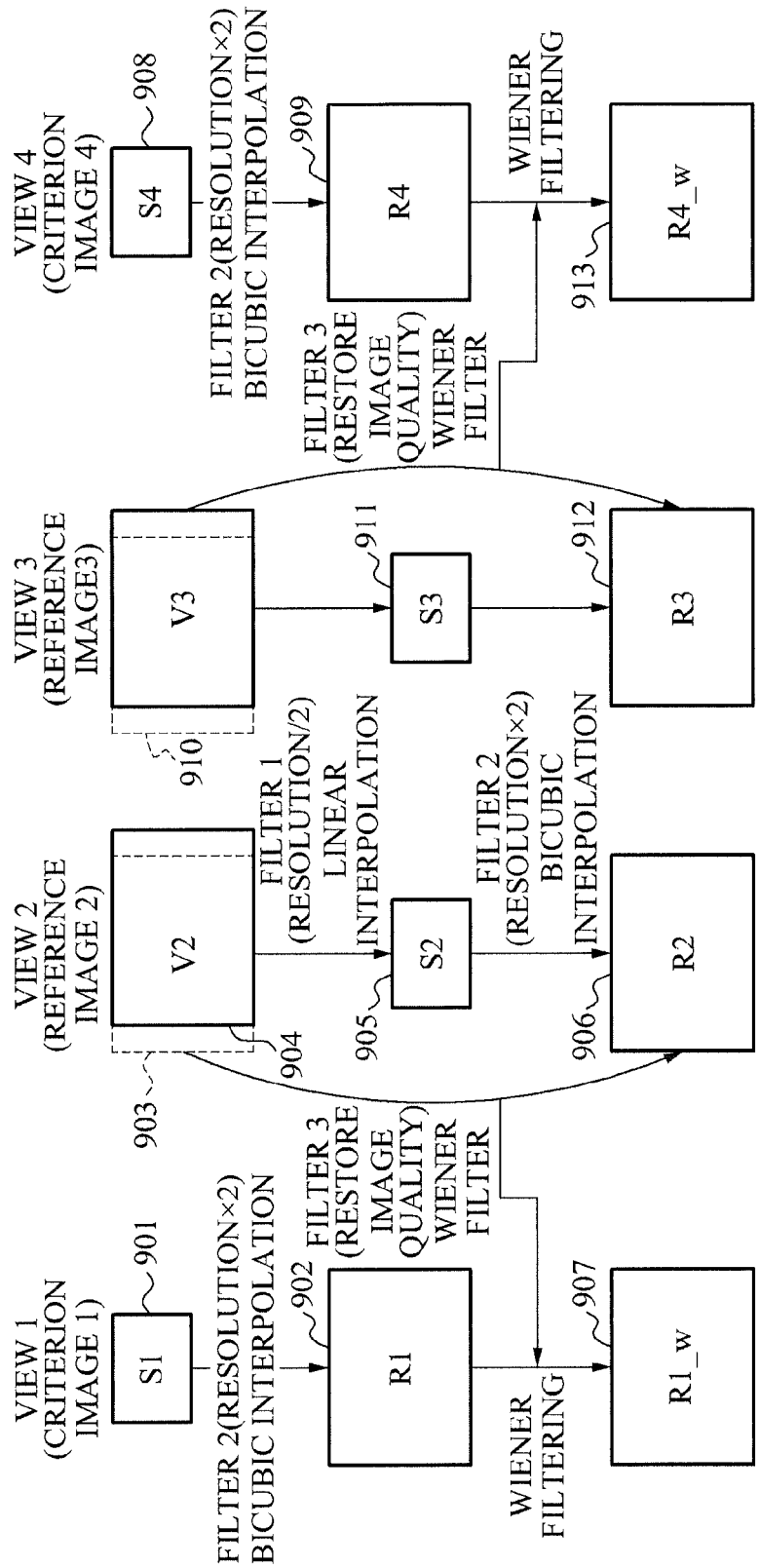
FIG. 9 illustrates a process of restoring a resolution using four view images according to example embodiments.

FIG. 9 illustrates a process of restoring a resolution using four view images, according to example embodiments.

In FIG. 9, a four-view-based free viewpoint television (FTV) system may be used as a resolution restoration apparatus.

Referring to FIG. 9, the resolution restoration apparatus may receive a multi-view image including four views. The resolution restoration apparatus may determine a high resolution view image neighboring a low resolution criterion image, from the multi-view image to be a reference image. The resolution restoration apparatus may restore a resolution of the criterion image using the reference image.

As an example, when a view 1 corresponds to a low resolution criterion image 1 901, the resolution restoration apparatus may determine a view 2 corresponding to a high resolution view image neighboring the criterion image 1 901 to be a reference image 2 903, among four view images. Similarly, when a view 4 corresponds to a low resolution criterion image 4 908, the resolution restoration apparatus may determine, to be a reference image 3 910, a view 3 corresponding to a high resolution view image neighboring the criterion image 4 908.

The resolution restoration apparatus may respectively up-scale the criterion image 1 901 and the criterion image 4 908. The resolution restoration apparatus may down-scale the reference image 2 903 and the reference image 3 910, and up-scale a down-scaled reference image 2 905 and a down-scaled reference image 3 911, respectively. The resolution restoration apparatus may generate detailed information 1 using an up-scaled reference image 2 906 and the original reference image 2 903, and may generate detailed information 2 using an up-scaled reference image 3 912 and the original reference image 3 910. In this instance, before the detailed information is generated, the resolution restoration apparatus may compensate for a viewpoint difference of the reference image 2 903, and a viewpoint difference of the reference image 3 910, using a global disparity process or a local disparity process. For example, a reference image 2 904, of which viewpoint difference is compensated for, may have a viewpoint identical to a viewpoint of the criterion image 1 901.

The resolution restoration apparatus may restore a resolution of the criterion image 1 901 using an up-scaled criterion image 1 902, and the detailed information 1. Similarly, the resolution restoration apparatus may restore a resolution of the criterion image 4 908 using an up-scaled criterion image 4 909, and the detailed information 2. In other words, the resolution restoration apparatus may generate a restored image 1 907 with the restored resolution of the criterion image 1 901, and a restored image 2 913 with the restored resolution of the criterion image 4 908.

The resolution restoration apparatus may generate at least one virtual view image using the restored image 1 907 and the reference image 2 903. Similarly, the resolution restoration apparatus may generate at least one virtual view image using the restored image 4 913 and the reference image 3 910.

Figure 10:
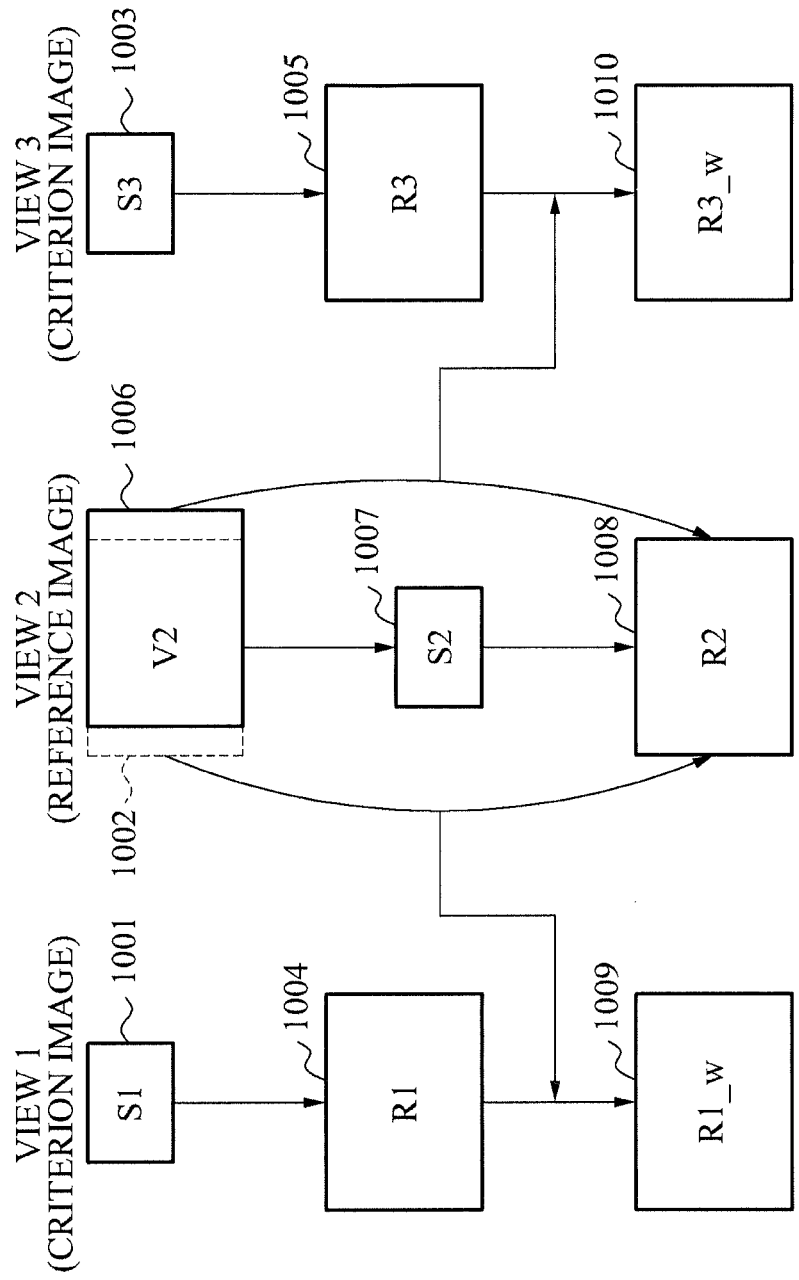
FIG. 10 illustrates a process of restoring a resolution using three view images, according to example embodiments.

FIG. 10 illustrates a process of restoring a resolution using three view images according to example embodiments.

FIG. 10 is different from FIG. 9 in that a resolution of a low resolution criterion image may be restored by receiving an input of a multi-view image including three views, that is, only the number of the input images is different. A detailed configuration to restore the resolution is substantially identical to the configuration of FIG. 9, and thus, a duplicated description will be omitted for conciseness.

Referring to FIG. 10, the resolution restoration apparatus may receive a multi-view image including a view 1 corresponding to a low resolution criterion image 1001, a view 2 corresponding to a high resolution reference image 1002, and a view 3 corresponding to a low resolution criterion image 1003.

In order to restore a resolution of a low resolution criterion image, a view image neighboring the low resolution image should correspond to a high resolution image. Accordingly, when a multi-view image including three views is received, the multi-view image may include a high resolution reference image between two low resolution criterion images.

The resolution restoration apparatus may up-scale the criterion image 1001 and the criterion image 1003. The resolution restoration apparatus may generate detailed information by down-scaling a reference image 1006, and then up-scaling a down-scaled reference image 1007. In this instance, as described with reference to FIG. 9, the resolution restoration apparatus may generate detailed information 1 and detailed information 2 by respectively compensating for a viewpoint difference between the criterion image 1001 and the reference image 1002, and a viewpoint difference between the reference image 1002 and the criterion image 1003. The resolution restoration apparatus may restore a resolution of the criterion image 1001 based on the detailed information 1 and an up-scaled criterion image 1009, and may restore a resolution of the criterion image 1003 based on the detailed information 2 and an up-scaled view 3 1010.

According to example embodiments, a resolution of a low resolution image may be restored to be a high resolution image, using an adjacent view image neighboring the low resolution image.

According to example embodiments, a virtual view image may be generated by restoring a resolution of a low resolution image, thereby reducing quality degradation of the virtual view image.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc- Read Only Memory), and a CD-R (Recordable)/RW. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the resolution restoration apparatus, as shown in FIG. 7, for example, may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of restoring a resolution, the method comprising:
   up-scaling, by a processor, a criterion image having a first view based on a resolution of a reference image having a second view, neighboring the criterion image, such that the first view and the second view are different;
   generating detailed information, based on the reference image; and
   restoring a resolution of the criterion image using the up-scaled criterion image and the detailed information.

2. The method of claim 1, wherein
   the criterion image corresponds to a low resolution image, and
   the reference image corresponds to a high resolution image neighboring the criterion image, and has an adjacent viewpoint different from a viewpoint of the criterion image.

3. The method of claim 1, wherein
   the detailed information comprises at least one of filter coefficient information and difference image information, and
   the restoring comprises restoring the resolution of the criterion image by filtering the up-scaled criterion image, based on at least the filter coefficient.

4. The method of claim 3, wherein the restoring comprises restoring the resolution of the criterion image using the difference image information and the up-scaled criterion image.

5. The method of claim 1, wherein the generating comprises:
   down-scaling the reference image based on the resolution of the criterion image;
   up-scaling the down-scaled reference image based on the resolution of the reference image; and
   generating the detailed information using the up-scaled reference image and the reference image.

6. The method of claim 1, wherein the restoring comprises:
   dividing the up-scaled criterion image into a plurality of blocks;
   determining, from the reference image, a block corresponding to a criterion block that is one of the plurality of divided blocks;
   calculating a disparity based on the criterion block and the corresponding block of the reference image; and
   compensating for a viewpoint difference between the criterion image and the reference image, based on the calculated disparity.

7. The method of claim 6, wherein the calculating the disparity comprises using a pixel location difference between the criterion block and the corresponding block.

8. The method of claim 6, wherein the generating comprises:
   calculating a resolution ratio based on the resolution of the criterion image and the resolution of the reference image;
   down-scaling the corresponding block based on the resolution ratio;
   up-scaling the down-scaled corresponding block based on the resolution ratio; and
   generating detailed information of the corresponding block based on the up-scaled corresponding block and the corresponding block,
   wherein the restoring comprises restoring a resolution of a current block corresponding to the criterion block, from the criterion image, using the detailed information of the corresponding block and the criterion block.

9. The method of claim 6, wherein the compensating comprises compensating for the viewpoint difference by applying the disparity to all blocks constituting the criterion image.

10. The method of claim 6, wherein the compensating comprises compensating for a viewpoint difference for each of the blocks constituting the criterion image, based on each disparity calculated using blocks of the reference image corresponding to each of the blocks of the criterion image.

11. The method of claim 1, further comprising:
   generating a virtual view image by synthesizing the reference image and the criterion image with the restored resolution.

12. The method of claim 1, wherein the restoring comprises restoring a high frequency element of a low resolution image.

13. An apparatus for restoring a resolution, the apparatus comprising:
   an up-scaling unit to up-scale a criterion image having a first view based on a resolution of a reference image having a second view, neighboring the criterion image, such that the first view and the second view are different;
   a detailed information generator to generate detailed information based on the reference image; and
   a restoration unit to restore a resolution of the criterion image using the up-scaled criterion image and the detailed information.

14. The apparatus of claim 13, wherein
   the criterion image corresponds to a low resolution image constituting a multi-view image, and
   the reference image corresponds to a high resolution image neighboring the criterion image, and has an adjacent viewpoint different from a viewpoint of the criterion image.

15. The apparatus of claim 13, wherein
   the detailed information comprises at least one of filter coefficient information and difference image information, and
   the restoration unit restores the resolution of the criterion image by filtering the up-scaled criterion image, based on the filter coefficient.

16. The apparatus of claim 15, wherein the restoration unit restores the resolution of the criterion image using the difference image information and the up-scaled criterion image.

17. The apparatus of claim 13, wherein the detailed information generator down-scales the reference image, based on the resolution of the criterion image, up-scales the down-scaled reference image, based on the resolution of the reference image, and generates the detailed information using the up-scaled reference image and the reference image.

18. The apparatus of claim 13, wherein the restoration unit comprises:
a corresponding block determining unit to divide the up-scaled criterion image into a plurality of blocks, and to determine, from the reference image, a block corresponding to a criterion block that is one of the plurality of divided blocks;
a disparity calculating unit to calculate a disparity, based on the criterion block and the corresponding block of the reference image; and
a compensation unit to compensate for a viewpoint difference between the criterion image and the reference image, based on the calculated disparity.

19. The apparatus of claim 18, wherein the calculating the disparity comprises using a pixel location difference between the criterion block and the corresponding block.

20. The apparatus of claim 18, wherein
the detailed information generator calculates a resolution ratio, based on the resolution of the criterion image and the resolution of the reference image, down-scales the corresponding block, based on the resolution ratio, up-scales the down-scaled corresponding block, based on the resolution ratio, and generates detailed information of the corresponding block, based on the up-scaled corresponding block and the corresponding block,
wherein the restoration unit restores a resolution of a current block corresponding to the criterion block, from the criterion image, using the detailed information of the corresponding block and the criterion block.

21. The apparatus of claim 18, wherein the compensation unit compensates for the viewpoint difference by applying the disparity to all blocks constituting the criterion image.

22. The apparatus of claim 18, wherein the compensation unit compensates for a viewpoint difference for each of the blocks constituting the criterion image, based on each disparity calculated using blocks of the reference image corresponding to each of the blocks of the criterion image.

23. The apparatus of claim 13, further comprising:
a virtual view image generator to generate a virtual view image by synthesizing the reference image and the criterion image with the restored resolution.

24. The apparatus of claim 23, wherein the up-scaling unit, the restoration unit, and the virtual view image generator are included in one chip.

25. A method for restoring a resolution of a multi-view image, the method comprising:
up-scaling, by a processor, a low-quality image having a first view, among images constituting the multi-view image; and
restoring a high-frequency element to the low quality image, using detailed information and the up-scaled low-quality image,
wherein the detailed information is generated based on a reference image having a second view, neighboring the low quality image, such that the first view and the second view are different.

26. The method of claim 25, wherein the detailed information comprises at least one of filter coefficient information and difference image information.

27. The method of claim 25, wherein the restoring of the high-frequency element comprises at least one of filtering the low quality image based on the filter coefficient information and adding or removing the difference image information from the low-quality image.

* * * * *

UNITED STATES PATENT AND TRADEMARK OFFICE
CERTIFICATE OF CORRECTION

PATENT NO. : 8,879,872 B2  
APPLICATION NO. : 13/489973  
DATED : November 4, 2014  
INVENTOR(S) : Seok Lee et al.

Page 1 of 1

It is certified that error appears in the above-identified patent and that said Letters Patent is hereby corrected as shown below:

On the title page

Column 2, Item [56] (Other Publications), line 1, delete "Scenecs"" and insert -- Scenes" --, therefor.

Signed and Sealed this
Second Day of June, 2015

Michelle K. Lee
*Director of the United States Patent and Trademark Office*